United States Patent
Davis et al.

(10) Patent No.: US 7,494,531 B2
(45) Date of Patent: Feb. 24, 2009

(54) METHOD OF, AND APPARATUS FOR DEFOAMING

(75) Inventors: John Davis, Fort Erie (CA); Laura Cochrane, Grimsby (CA)

(73) Assignee: Allen-Vanguard Corporation (CA)

( * ) Notice: Subject to any disclaimer, the term of this patent is extended or adjusted under 35 U.S.C. 154(b) by 505 days.

(21) Appl. No.: 11/294,873

(22) Filed: Dec. 6, 2005

(65) Prior Publication Data

US 2006/0249463 A1  Nov. 9, 2006

(30) Foreign Application Priority Data

Dec. 6, 2004   (CA)   ................................. 2489112

(51) Int. Cl.
*B01D 19/04*   (2006.01)
(52) U.S. Cl. ............................ 95/242; 96/180; 516/115; 15/353
(58) Field of Classification Search .................. 95/242, 95/155, 157; 96/176, 180; 516/115
See application file for complete search history.

(56) References Cited

U.S. PATENT DOCUMENTS

| | | | |
|---|---|---|---|
| 4,360,946 A | * 11/1982 | Marshall et al. ............... | 15/321 |
| 4,974,618 A | * 12/1990 | Nysted ......................... | 134/21 |
| 5,813,086 A | 9/1998 | Ueno et al. ................... | 15/320 |
| 6,405,626 B1 | 6/2002 | Bureaux et al. ................ | 86/50 |
| 6,439,120 B1 | 8/2002 | Bureaux et al. ............. | 102/303 |
| 6,553,887 B1 | 4/2003 | Bureaux et al. ................ | 86/50 |

\* cited by examiner

*Primary Examiner*—Duane S Smith
*Assistant Examiner*—Douglas J Theisen
(74) *Attorney, Agent, or Firm*—Hayes Soloway P.C.

(57) ABSTRACT

Defoaming equipment, and more particularly, removing, defoaming, and storing large amounts of foam after a Blast Mitigation or Decontamination Foam has been used in either an open area or in an contained area is described. An apparatus is provided for defoaming, comprising: a vacuum system, including a vacuum head for drawing the foam through a suction hose terminating in a nozzle, that feeds the foam into a holding tank that initially stores a quantity of defoaming agent, and a pump drawing the defoaming agent from the holding tank to at least one injector that is fitted on the vacuum-side of the vacuum system, whereby the defoaming agent is actively mixed with the collected foam, reducing the collected foam. The reduced foam and defoaming agent are recirculated through the pump and the nozzle, the suction hose, the vacuum system, the injector and holding tank are of chemical-resistant construction.

13 Claims, 6 Drawing Sheets

METHOD OF, AND APPARATUS FOR DEFOAMING

FIELD OF INVENTION

The present invention relates to the field of defoaming equipment, and more particularly, to removing, defoaming, and storing large amounts of foam after a Blast Mitigation or Decontamination Foam has been used in either an open area or in a contained area.

BACKGROUND OF THE INVENTION

In the past, defoaming equipment was used primarily in the defoaming of carpets after a cleaning process. This was accomplished by vacuuming foam into a holding tank incorporated in a carpet cleaning machine and passively mixing it with some type of liquid defoamer. An example of such a system appears in U.S. patent application Ser. No. 5,813,086. This was done to break down the detergent in a simple and inexpensive manner, thereby reducing the space required to contain the spent liquid.

Current generations of Blast and Decontamination Foams are considerably thicker and more stable than industrial cleaning foams, are much harder to break down, and readily produce copious amounts of additional foam when agitated; all aspects that render conventional defoaming techniques impractical. These new foams include, for example, those described in U.S. patent application Ser. No. 6,405,626, issuing on Jun. 18, 2002 and titled "Decontaminating and Dispersion Suppressing Foam Formulation", and in U.S. patent application Ser. No. 6,553,887, issuing on Apr. 29, 2003 and titled "Foam Formulations". There is a need for a method of, and an apparatus for breaking down and collecting these new foams.

These new foams may be employed in a variety of manners. For example, Blast Mitigation Structures have been developed such as those described in U.S. patent application Ser. No. 6,439,120, issuing on Aug. 27, 2002, and titled "Apparatus and Method for Blast Suppression". In short, this patent describes the process of placing a fabric tent-like structure over a suspect package, filling the tent with Blast Mitigation Foam, and detonating the suspect package. The tent-like structure and Blast Mitigation Foam absorb the energy of the explosion and contain any contaminants. The contents of the Blast Mitigation Structure must then be removed and disposed of, while minimizing the risk of exposing technicians and/or the environment to hazardous materials. This is also preferably done without coating the Blast Mitigation Structure with defoaming compound, which might compromise the use of the Blast Mitigation Structure in the future. Presently, there are no effective ways of doing this.

Similarly, various foams may be used to decontaminate vehicles or surface areas exposed to chemical, biological or radiological components or similar threats. No effective means or methods of collecting such decontaminant foams are currently available.

There is therefore a need for a method of and apparatus for defoaming, provided with consideration for the problems outlined above.

SUMMARY OF THE INVENTION

It is therefore an object of the invention to provide an improved method of, and an apparatus for defoaming, which obviates or mitigates at least one of the disadvantages described above.

The present invention allows for the defoaming of Blast Mitigation Foam systems (such as the Universal Containment System available from Allen-Vanguard Corporation) as well as small or large scale Area Decontamination or Containment Foams.

This is accomplished by first mixing a measured amount of defoaming liquid to the proper ratio of water in a holding tank. Any defoaming agent can be used with the mechanical system of the described invention. In order to break the foaming capability of the originally dispensed foam, the defoaming agent must simply have a lower surface tension than the surfactant used to generate the foam in the first place.

The defoaming agent is then pumped through a series of hoses dispensing it into the collected foam through one or more injectors located near a vacuum nozzle head and again through one or more injectors located where the suction hose enters the holding tank. The defoaming agent is constantly re-circulated throughout the system to continually provide contact with the foam that is being extracted.

When used with a Blast Mitigation Structure (BMS), the foam is brought in through an arcuate vacuum suction nozzle, specifically designed to accommodate the BMS. The arcuate nozzle has been designed to present a very low profile to minimize any residue remaining in the tent, and is shaped to match the floor opening of the BMS so that it can extract the foam from within the tent over the largest possible area, with minimum risk of coming into contact with and possibly triggering, an explosive device that the system is containing.

The same process and apparatus may be used to collect foam from the decontamination of vehicles or areas. It is preferred to use an elongated nozzle to perform such defoaming, the elongated nozzle having a squeegee surface on three sides to help direct the suction and draw the foam in.

The system will break down and retain Blast Mitigation Foam and Area Decontaminating Foam containing pertinent forensic evidence. The system will also break down and retain Blast Mitigation Foam and Decontaminating Foam containing the by-products of chemical, biological, and radiological particles.

The holding tank on this system can be removed and replaced when full capacity is reached. This allows continued defoaming, almost immediate gathering of evidence, and quick containment and scientific study for the presence of chemical and biological by-products as well as radiological particles.

According to an embodiment of the invention there is provided an apparatus for defoaming, comprising: a vacuum system for collecting foam, the vacuum system including a vacuum head for drawing the foam through a suction hose terminating in a nozzle, the vacuum system feeding the foam into a holding tank; the holding tank initially storing a quantity of defoaming agent; and a pump for drawing the defoaming agent from the holding tank and feeding the defoaming agent to at least one injector, the at least one injector being fitted on the vacuum-side of the vacuum system, whereby the defoaming agent is actively mixed with the collected foam, reducing the collected foam, and the reduced foam and defoaming agent are recirculated through the pump; the nozzle, the suction hose, the vacuum system, the at least one injector and the holding tank being of chemical-resistant construction.

According to another embodiment of the invention there is provided a method of defoaming comprising the steps of: collecting foam using a vacuum system, the vacuum system including a vacuum head for drawing the foam through a suction hose terminating in a nozzle, the vacuum system feeding the foam into a holding tank; initially storing a quantity of defoaming agent in the holding tank; and drawing the defoaming agent from the holding tank and feeding the defoaming agent to at least one injector using a pump, the at least one injector being fitted on the vacuum-side of the vacuum system, whereby the defoaming agent is actively mixed with the collected foam, reducing the collected foam, and the reduced foam and defoaming agent are recirculated through the pump; the nozzle, the suction hose, the vacuum system, the at least one injector and the holding tank being of chemical-resistant construction.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

An exemplary apparatus for implementing the invention will be described with respect to the embodiments appearing in FIGS. 1-6. A partial parts list of the components used in these embodiments is summarized in the following table:

drop tube 42 can be seen. The lid 48 of the holding tank 18 is also not shown in FIG. 1 so that the relationship of the pump 20 and other components can be seen. All of these components, including the lid 48 and holding tank 18, are shown in FIGS. 2A and 2B. The pump 20 and other components are shown in a partially exploded view in FIG. 1, but are generally mounted on the lid 48 of the holding tank 18 as shown in FIGS. 2A and 2B. The pump 20 may be mounted directly on the lid 48, supported by standoffs or some other for of bracket.

Figure 3:
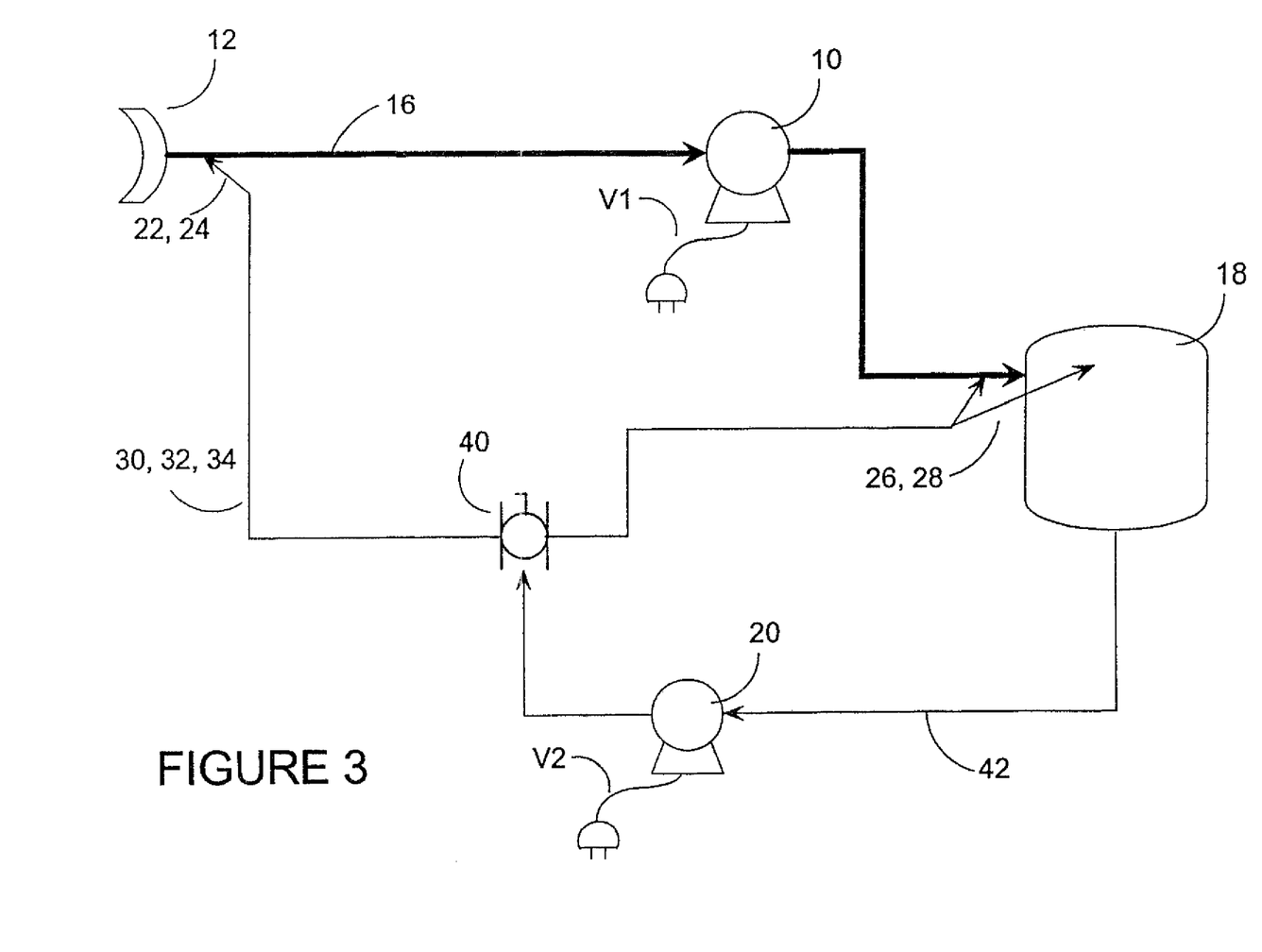
FIG. 3 presents an electrical and process schematic in an embodiment of the invention.

FIG. 3 presents the same system schematically, showing both the electrical control and process flow. The electrical control is quite simple in this embodiment as the pump 20 and vacuum head 10 are powered and controlled independently of one another, from 120 VAC sources via separate electrical cords V1 and V2. These two devices may be are turned on and off with manual electrical switches, or alternatively, a simple electrical interlock system may be employed to ensure that the pump 20 only operates when the vacuum head 10 is running (to prevent defoaming agent from accidentally pouring out through the nozzle 12, 14). Other safety interlocks may also be provided, for example, to shut the system down in the event that the holding tank 18 is full, or missing.

Figure 4:
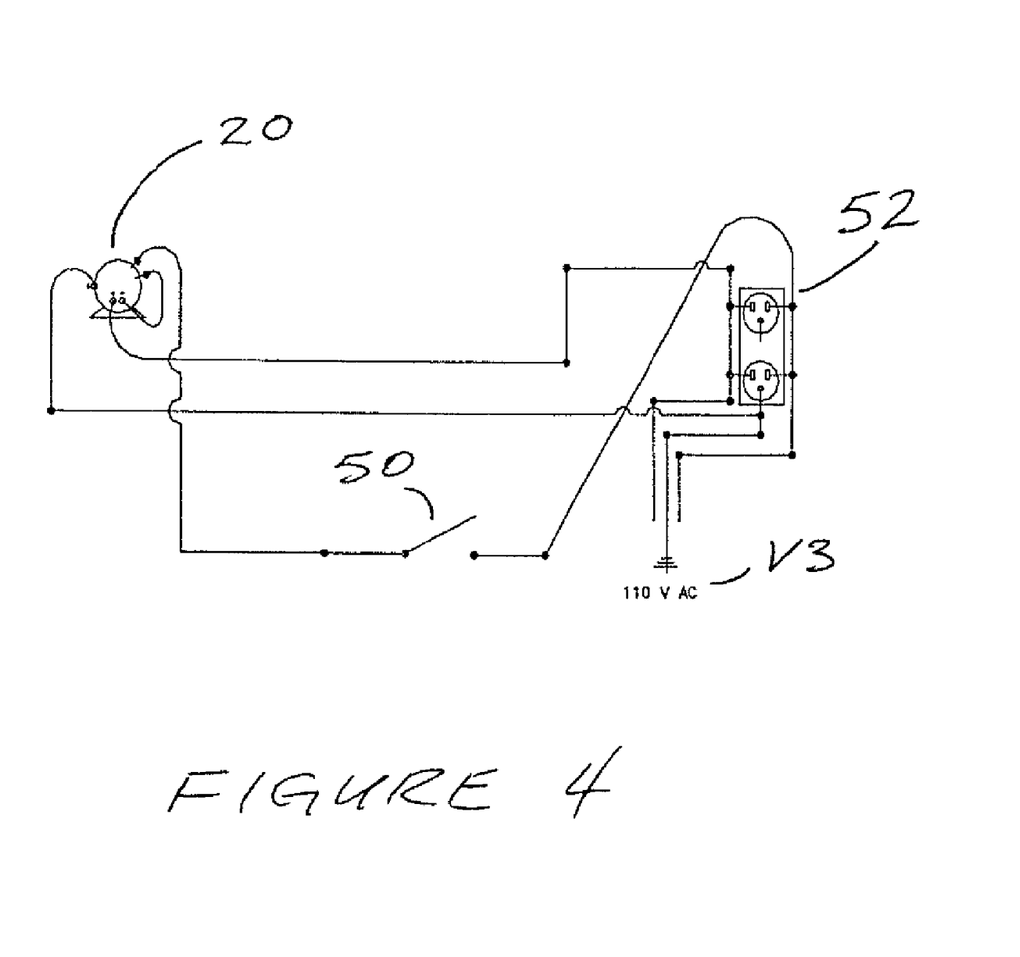
FIG. 4 presents a detail of the electrical wiring in an embodiment of the invention.

FIG. 4 presents an exemplary electrical control system in which the pump is hard-wired to a toggle switch 50, which receives power from the line side of a 120 VAC insulated receptacle 52. The insulated receptacle 52 is used to bring power to the vacuum head 10, and is powered by an electrical cord V3.

In the operation of the defoaming system a measured amount of defoaming solution is mixed with a measured amount of water and is poured into the holding tank 18. The holding tank 18 may consist of any suitable container that vacuum head 10 may be mounted on, or may be connected to via suitable pipes or hoses. This may include, for example, a stock plastic container from ShopVac, or a sealable container suitable for storage and transport of radioactive or biological waste, or even containers permanently mounted on vehicles or trailers. The Enpac 1065-YE has the particularly convenient features of being nestable, having a gasketed lid which seals the contents, being approved for use as a waste handling container and being fabricated of a relatively chemically inert polyethylene.

| | | DEFOAMER MATERIALS LIST | | |
|---|---|---|---|---|
| Item | Part | Part Description | Part # | Supplier |
| 10 | Vacuum Head | ShopVac | | ShopVac |
| 12 | BMF Nozzle | Suction Nozzle (BMF) | TD-DF-007 | VRS |
| 14 | SDF Nozzle | Suction Nozzle (SDF) | TD-DF-008 | VRS |
| 16 | Suction Hose | 2½" Hose | | |
| 18 | Holding Tank | 65 Gal. Overpack | 1065-YE | Enpac |
| 20 | Pump | Diaphragm Pump | 2088-594-500 | SHURflo |
| 22 & 24 | Mixing Nozzle | Kynar VeeJet | H-1/8-V V -KY 120 08 | John Brooks |
| 26 & 28 | Return Nozzle | Kynar VeeJet | H-1/8-V V -KY 120 08 | John Brooks |
| 30, 32 & 34 | Outlet Line | ⅛" Tubing G3 | | |
| 36 & 38 | Return line | ⅛" Tubing G3 | | |
| 40 | Ball Valve | ¼" Female × Female | | |
| 42 | Drop Tube | ⅝" Tubing | | |
| 44 | Inlet Line | ½" Tubing | | |
| 46 | Outlet Line | ½" Tubing | | |
| 48 | Holding Tank Lid | | | Enpac |

Figure 1:
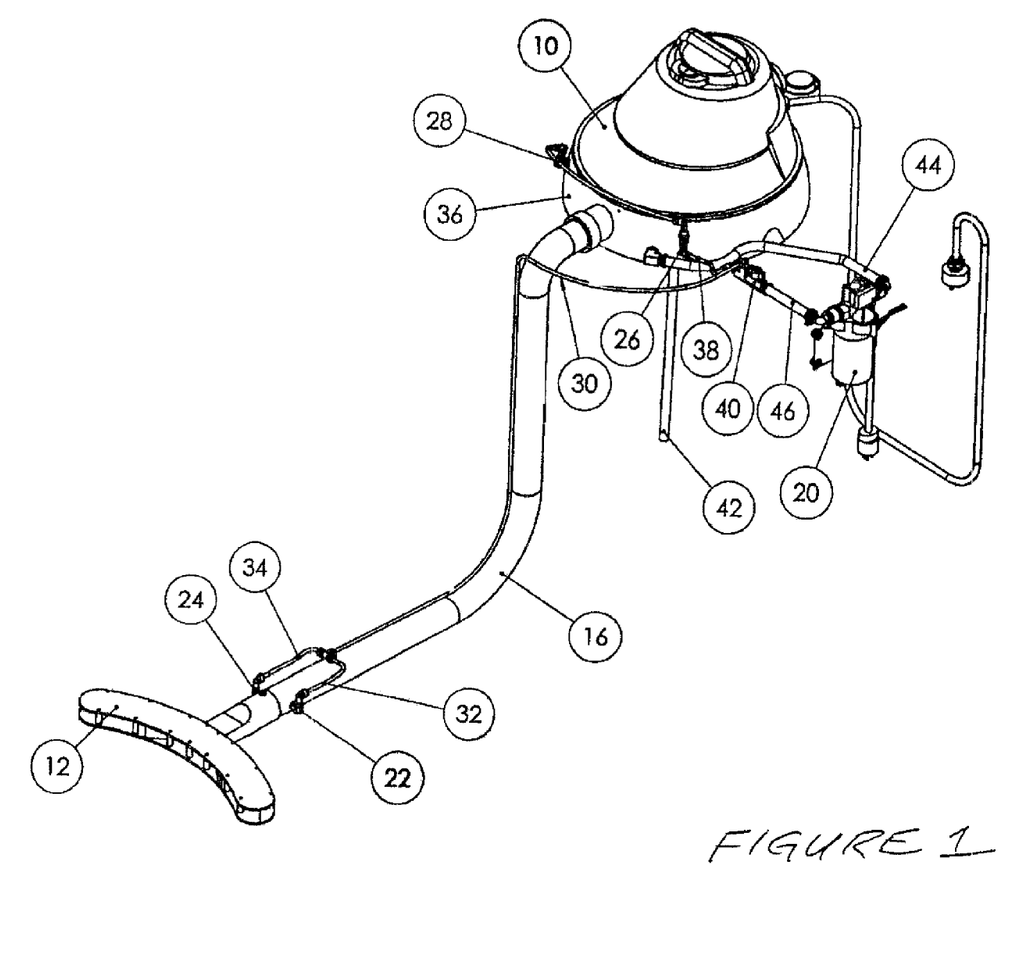
FIG. 1 presents a perspective, partially-exploded view of a defoaming system in an embodiment of the invention.
Figure 2A:
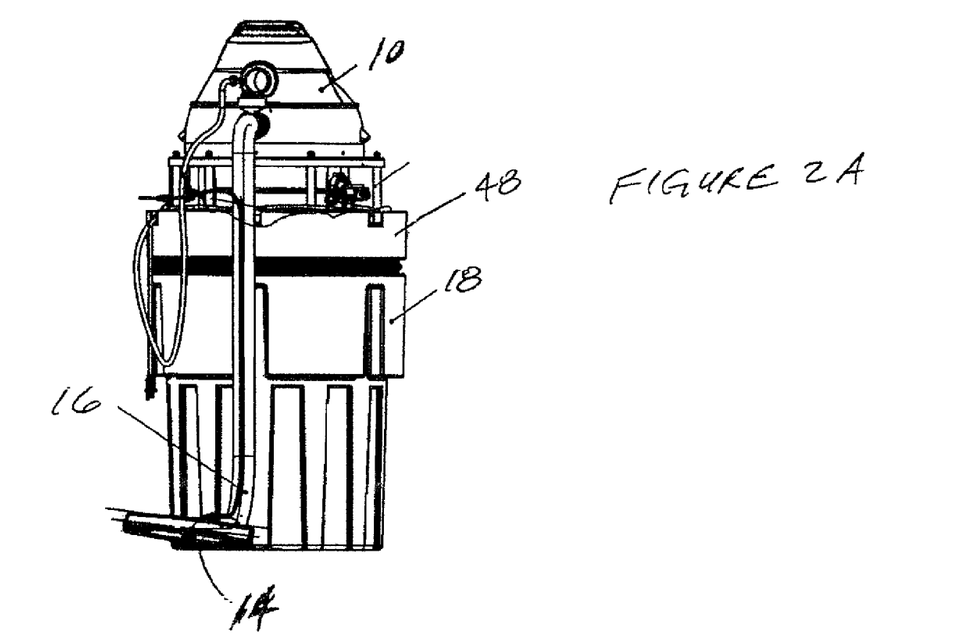
FIGS. 2A and 2B present front and side views respectively, of the defoaming system of FIG. 1, further including a holding tank and lid for the holding tank.
Figure 2B:
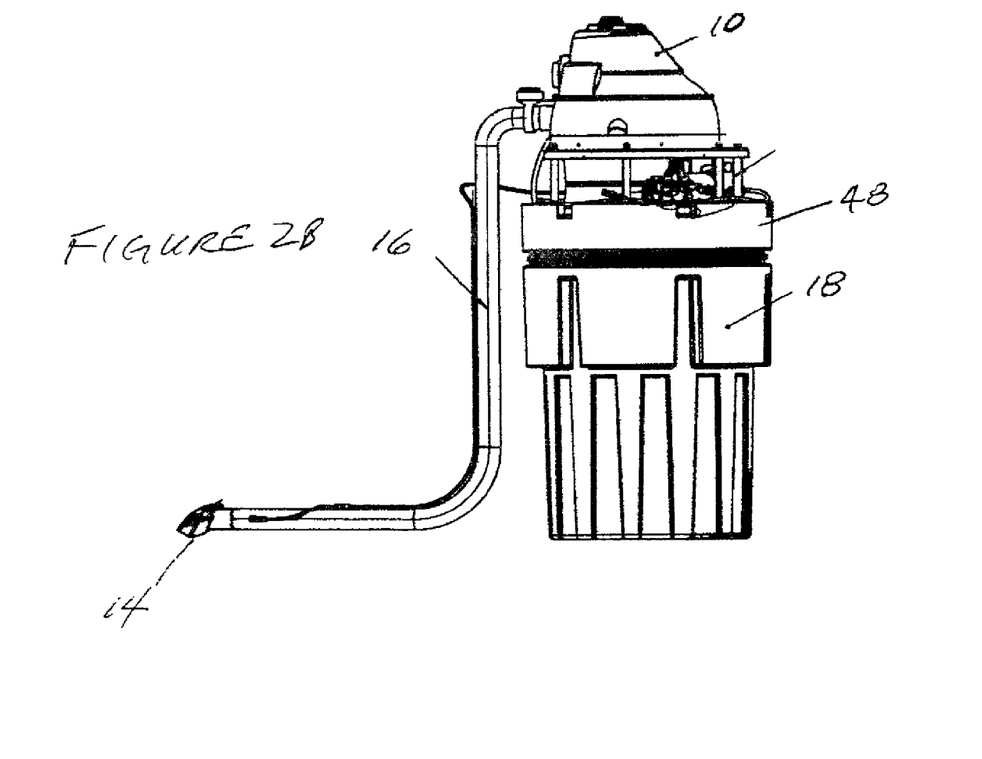

FIG. 1 presents a perspective view of the components of the system, with the holding tank 18 removed so that the interior The pump 20 is turned to the on position and the defoaming solution is drawn up the drop tube 42 through inlet line 44 to pump 20. The defoaming solution is then brought through the pump 20 into outlet line 46, it is allowed free travel down return line 38 to tank return nozzle 26 through return line 36 and into tank return nozzle 28. This is the re-circulate only mode.

Pump 20 identified above is a self-priming diaphragm pump which operates on 120 VAC, and deliveries a flow rate of up to 3 gallons per minute (though the flow rate does vary with the back pressure). Like the other components of the system, the portions of the pump 20 that are in contact with the defoaming agent and foam being collected are made of chemically resistant materials. Of course, other similar pumps could also be used. The voltage for the pump, for example could be specified to match whatever voltage is locally available.

The spray nozzles 22, 24, 26 and 28 are KYNAR™ VeeJet™, small capacity injectors, which provide a flat spray that is easy to align. They are also made out of chemical and corrosion-resistant material. Other injectors could also be used.

There are many suitable wet/dry vacuum heads 10 available, which again, are preferably of chemical resistant construction. The voltage for the vacuum head 10 should also match whatever is locally available.

As the remaining liquid flows past tank return nozzle 26 it is directed by a directional control valve 40, such as a ball valve. If the solution reaches valve 40 in the closed position it is only allowed to circulate as described above. When valve 40 is in the opened position the solution travels down outlet line 30 diverting at the junction of outlet line 32 and outlet line 34 and out mixing nozzle 22 and mixing nozzle 24.

Turning the power on at vacuum head 10 causes a vacuum in suction hose 16. The vacuum in suction hose 16 causes the foam to be drawn in through suction nozzle 12 into suction hose 16 where it comes into contact with defoaming solution through mixing nozzles 22 and 24. The foam continues up suction hose 16 through vacuum head 10 where it is hit again with the defoaming solution through return nozzles 26 and 28.

At this point the foam has been brought back to a liquid state, falls into holding tank 18 is steadily sprayed from return nozzles 26 and 28 and the cycle continues.

The appropriate fittings, adapters, tubing, couplings, elbows, bushing, tees, straps and strainers required for any given implementation would be clear to the person skilled in the art.

Figure 5A:
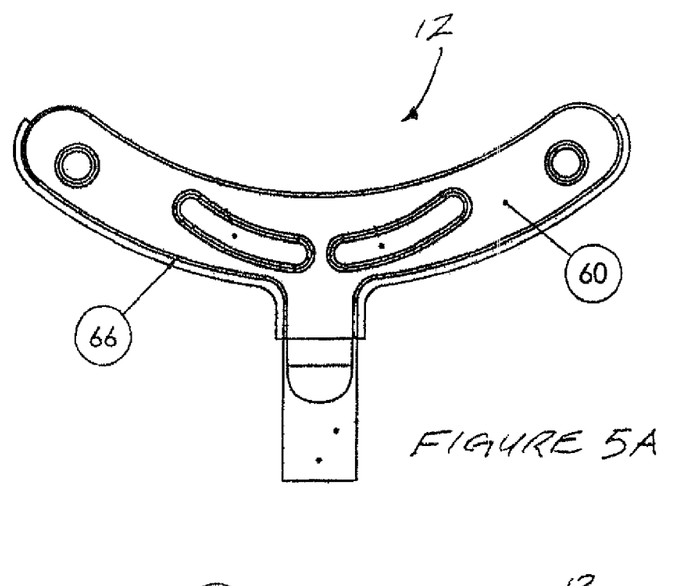
FIGS. 5A, 5B and 5C present top, side and perspective views of an arcuate nozzle in an embodiment of the invention.
Figure 5B:
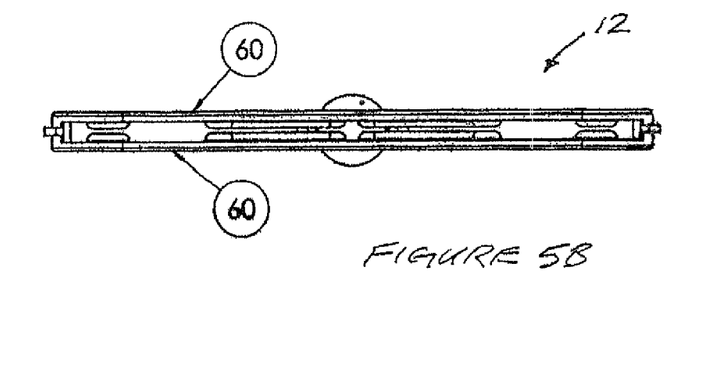
Figure 5C:
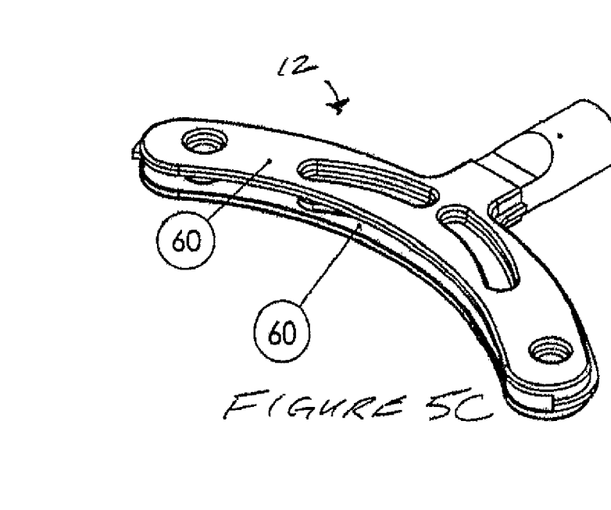
Figure 6A:
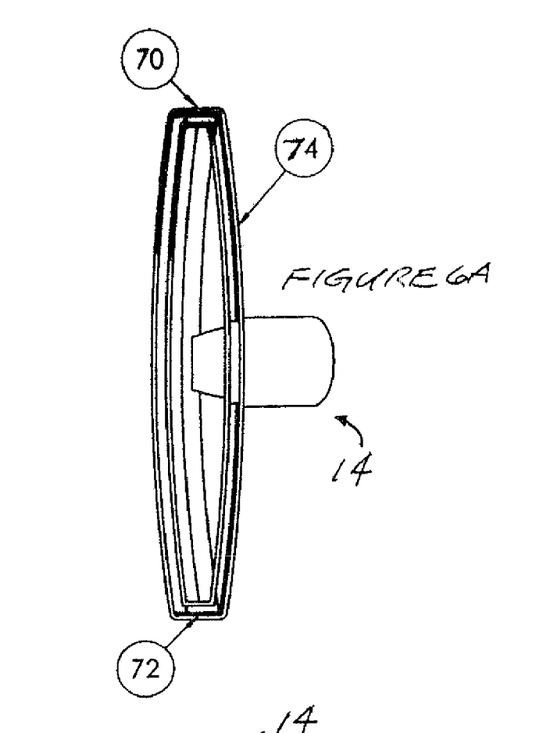
FIGS. 6A, 6B and 6C present bottom, side and perspective views of an elongated nozzle in an embodiment of the invention.
Figure 6B:
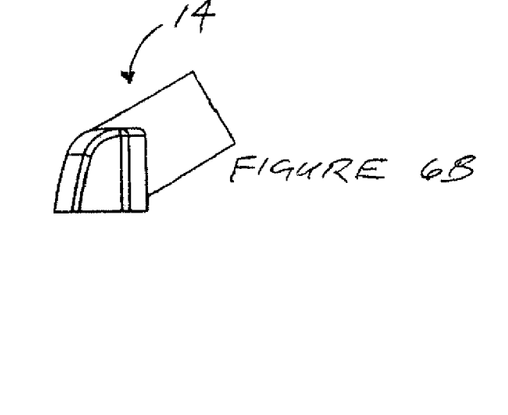
Figure 6C:
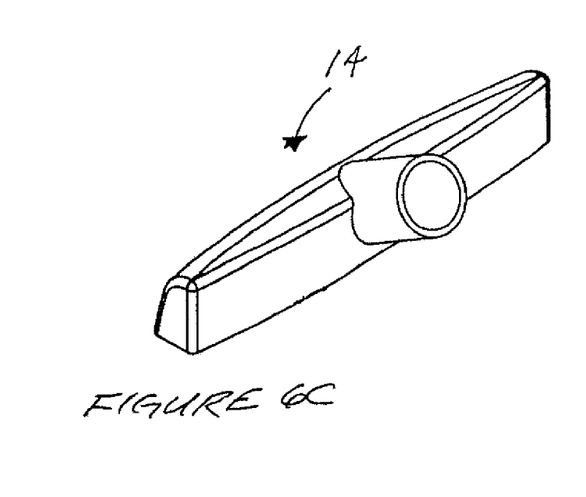

FIGS. 5 and 6 present exemplary vacuum nozzles that could be used with the invention. Of course, other designs could also be used depending on the application. The details of these two designs are given hereinafter, with respect to the description of their particular applications. Exemplary applications of the invention are as follows:

Blast Mitigation Foam (BMF)

This form of defoaming can be used for many scenarios, three examples of which are given below:

1) In the case where a trained Security Guard discovers a suspect package, he would place a Blast Mitigation Structure (BMS) over the suspect package and fill said structure with Mitigating Foam (MF) rendering the area relatively safe. A suitable BMS would be, for example, the Universal Containment System available from Vanguard Response Systems. A suitable MF would be, for example, GCE-2000 available from Vanguard Response Systems.

The BMS would remain in place until the proper Law Enforcement Agency arrives at the scene. At this time Law Enforcement may wish to determine (through x-ray) whether the suspect package is a serious threat. At this point the MF must be evacuated in order to x-ray and place the desired detonating device. The system of the invention provides the only suitable way of performing this evacuation of the MF.

2) A BMS is placed over a suspect package by a trained Law Enforcement Officer and the desired detonating device is placed. The BMS is filled with MF and the package detonated. It is now desirable to collect any blast related evidence. The BMS can be lifted and the MF allowed to flow, but then the evidence would also be allowed to flow with it into tall grass or into drains, or through cracks and crevices. Similarly, if the package was a "dirty bomb" containing some form of contaminant, lifting the BMS would allow the contaminant to escape. Clearly, this is not desirable.

3) A BMS is placed over a suspect package by a trained Law Enforcement Officer, the package is X-rayed and then disruptors are suitably positioned for maximum effect. The BMS is filled with MF and the disruptors fired. It is now desirable to remove the foam to establish whether the disruptors had the desired effect, or if additional means have to be employed and the BMS refoamed. At the same time It is necessary to ensure that there is no loss of valuable forensic evidence throughout this process.

The suction nozzle of FIGS. 5A, 5B and 5C is specifically developed for non-interference with suspect packages when covered by the BMS. As shown, this suction nozzle is Vacuum Formed from a chemically-resistant polymer. The low profile of this suction nozzle allows it to be slipped under the edge of the BMS.

The indentations in the two arc-shaped plates 60 not only hold the nozzle together and space the two plates apart, and help distribute the suction from the vacuum. Without such distribution, the vacuum would tend to draw foam from a very small area, simply creating a hole, rather than drawing all of the foam more uniformly from the BMS.

In operation, the suction nozzle of FIGS. 5A, 5B and 5C is inserted into the BMS, and a vacuum applied to pull the MF from the BMS. As the MF is evacuated it is sprayed with the defoaming solution as it enters the vacuum hose first and then again as it enters the holding tank. This recycling of the defoaming solution continues until the MF is brought to a low enough height within the BMS to allow properly trained Law Enforcement personnel to safely perform their required tasks. The holding tank is then removed, capped and replaced. This allows each holding tank to be removed and its contents examined for possible forensic evidence.

Note that it may be desirable in some applications to include a strainer or screen over the suction nozzle. This might be desirable, for example, when used with a BMS to ensure that small items such as detonators are not collected into the holding tank of the defoaming system.

This operation remains the same with the presence of a chemical, biological or radiological threat.

Area Decontamination or Containment Foams

Area decontamination and containment foams are used where Chemical, Biological, Radiological or other hazardous materials have been discovered.

The Decontamination or Containment Foam is applied over the contaminated area eliminating the risk of further air born particles, and neutralizing chemical and biological agents.

Chemical and Biological Surface Decontamination

In the case of military type chemical or biological threats, Decontamination Foam will neutralize the Contaminating Agent after application and a stated contact time. In the case of other Hazardous materials foam can be used to contain dangerous off gassing to reduce the surrounding area affected. The Defoamer in this instance is primarily used as a high capacity clean up tool. It does however, hold the remaining active agent in close proximity with the decontamination solution allowing the contact time to effect more complete neutralization, and assists in the retention of any forensic evidence that may be present, and will help to suck up and store, for subsequent clean up operations, any hazardous liquids or powders that might be present.

Radiological Surface Decontamination

In the case of a radiological cleanup, decontamination solution is applied to prevent the radiological particles from becoming air born. During cleanup, the Defoamer holding tank 18 will contain this hazard allowing the clean up operation for transfer to another permanent storage container if required.

In the case of area decontamination a modified elongated nozzle 14 as shown in FIGS. 6A, 6B and 6C is used to collect the Surface Decontamination Foam (SDF) and allow it to be vacuumed into the path of the defoaming solution. This elongated nozzle 14 is quite similar to conventional elongated vacuum nozzles, except that it only has a squeegee surface on three sides—the two short sides 70, 72 and one long side 74 (the side closest to the vacuum hose 16).

As the SDF enters the suction hose 16 it is sprayed with this defoaming solution by two (2) nozzles 22, 24 oriented at approximately 120° with respect to the direction of flow of the foam being collected. The mixture continues up the suction hose 16 in constant contact with one another and is again sprayed with defoaming solution as it enters the holding tank 18. The 120° orientation is against the direction of flow of the foam entering the holding tank to encourage mixing. The foam head in the holding tank 18 is also constantly sprayed with defoaming solution to further increase the defoaming rate.

The Defoaming Chemical:

Any defoaming agent can be used with the mechanical system of the described invention. The defoamer, in order to break the foaming capability of the originally dispensed foam, must simply have a lower surface tension than the surfactant used to generate the foam in the first place. This will provide the desired thinning and collapse of the lamella.

Possible chemical structures for defoamers are molecules with a low surface tension, such as silicone, mineral oils, fatty acids and fluorocarbons. The mechanical system of this invention provides the search stress to the solution in order to ensure the distribution of the chosen chemical defoamer.

The system is also designed to provide a means for the defoamer chemical to be recycled in order to continually provide contact to the foam that is being extracted. This improves the mechanical mixing, the contact between the defoaming chemicals and the foam, and minimizes the use of defoaming chemicals in this application for maximum cost effectiveness. Therefore, the ratio of defoamer to surfactant should be great enough to provide defoaming capability to the complete liquid volume of the holding tank. If these parameters are simply unknown to the end user (e.g. surface tension values, total volume), the system at any time can be stopped and more chemical defoamer can simply be added to the holding tank 18. This does not in any way jeopardize the application.

It should be noted however, that although the type of defoamer is not a critical component, care should be taken to ensure that a non-hazardous chemical solution is chosen in order to ensure the safety of the operator. Several non-toxic, biodegradable and environmentally friendly defoamers are available on the market to choose from. The selection of a suitable defoaming solution would be clear to one skilled in the art.

All citations are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. An apparatus for defoaming, comprising:
  a vacuum system for collecting foam, said vacuum system including a vacuum head for drawing said foam through a suction hose terminating in a nozzle, said vacuum system feeding said foam into a holding tank;
  said holding tank initially storing a quantity of defoaming agent; and
  a pump for drawing said defoaming agent from said holding tank and feeding said defoaming agent to at least one injector, said at least one injector being fitted on the vacuum-side of said vacuum system, whereby said defoaming agent is actively mixed with said collected foam, reducing said collected foam, and said reduced foam and defoaming agent are recirculated through said pump;
  said nozzle, said suction hose, said vacuum system, said at least one injector and said holding tank being of chemical-resistant construction.

2. The apparatus of claim 1, wherein said at least one injector comprises at least one injector fitted on said suction hose, adjacent to said nozzle.

3. The apparatus of claim 2, wherein said at least one injector fitted on said suction hose is angled against the flow of incoming foam, to encourage mixing.

4. The apparatus of claim 1, wherein said at least one injector comprises at least one injector oriented to spray said defoaming agent onto the contents of said holding tank.

5. The apparatus of claim 1, wherein said at least one injector comprises at least one injector oriented to spray said defoaming agent into said foam entering said holding tank.

6. The apparatus of claim 5, wherein said at least one injector fitted to spray said defoaming agent into said foam entering said holding tank, is angled against the flow of foam entering said holding tank, to encourage mixing.

7. The apparatus of claim 1, wherein said vacuum system is mounted on the mouth of said holding tank.

8. The apparatus of claim 7, wherein said vacuum system is removably mounted to the mouth of said holding tank.

9. The apparatus of claim 1, wherein said nozzle comprises an elongated nozzle with a squeegee on two short sides and on one long side, said elongated nozzle being suited for defoaming of surface areas.

10. The apparatus of claim 1, wherein said nozzle comprises two flat surfaces, spaced apart and having a low profile, thereby distributing said vacuum and avoiding localized tunneling in said foam.

11. The apparatus of claim 1, wherein said pump comprises a self-priming pump.

12. The apparatus of claim 1, wherein said at least one injector comprises a first injector fitted on said suction hose, adjacent to said nozzle, and a second injector oriented to spray said defoaming agent onto the contents of said holding tank, and further comprising a ball valve to balance flow of said first and second injectors.

13. A method of defoaming comprising the steps of:
  collecting foam using a vacuum system, said vacuum system including a vacuum head for drawing said foam through a suction hose terminating in a nozzle, said vacuum system feeding said foam into a holding tank;

initially storing a quantity of defoaming agent in said holding tank; and drawing said defoaming agent from said holding tank and feeding said defoaming agent to at least one injector using a pump, said at least one injector being fitted on the vacuum-side of said vacuum system, whereby said defoaming agent is actively mixed with said collected foam, reducing said collected foam, and said reduced foam and defoaming agent are recirculated through said pump;

said nozzle, said suction hose, said vacuum system, said at least one injector and said holding tank being of chemical-resistant construction.

* * * * *